April 9, 1935.  C. E. SUNDBERG  1,997,089

TIME SWITCH

Filed Feb. 23, 1929  2 Sheets-Sheet 1

Inventor:
Carl E. Sundberg
by Jas. H. Churchill
atty.

April 9, 1935.   C. E. SUNDBERG   1,997,089
TIME SWITCH
Filed Feb. 23, 1929   2 Sheets-Sheet 2

Inventor:
Carl E. Sundberg
by Jas. H. Churchill
atty.

Patented Apr. 9, 1935

1,997,089

UNITED STATES PATENT OFFICE 1,997,089

TIME SWITCH

Carl E. Sundberg, Quincy, Mass., assignor to Albert & J. M. Anderson Manufacturing Company, South Boston, Mass., a corporation of Massachusetts Application February 23, 1929, Serial No. 341,924

10 Claims. (Cl. 200—38)

This invention relates to apparatus for controlling the flow of gas, water, electricity, or the like, wherein a movable member is capable of being moved into one position substantially in an instant and of being moved into another position after the lapse of a predetermined time.

The invention in the present instance is embodied in an apparatus for controlling an electric circuit, and has for its object to provide apparatus in which provision is made for manually closing the circuit controller and for opening the same after a lapse of time by a spring motor under one condition of use, and for enabling the circuit controller to be manually closed and opened under another condition of use.

The invention further has for its object to provide apparatus in which a circuit controller of standard and approved construction capable of handling a relatively strong current may be used.

To these ends, the apparatus is provided with a rock-shaft having means for operating the circuit controller, and said rock-shaft is geared to the shaft of the spring motor, so that the rock-shaft may be rotated in one direction by manual rotation of the spring motor shaft, and may be rotated in the opposite direction by rotation of the spring motor shaft under the influence of the spring motor.

Provision is made for enabling the rock-shaft to be rotated at one speed by manual rotation of the spring motor shaft, and to be rotated at a slower speed by rotation of the spring motor shaft under the influence of the spring motor.

Provision is also made for enabling the circuit controller to be closed and opened manually independently of the spring motor shaft.

These and other features of this invention will be pointed out in the claims at the end of this specification.

Figure 1:
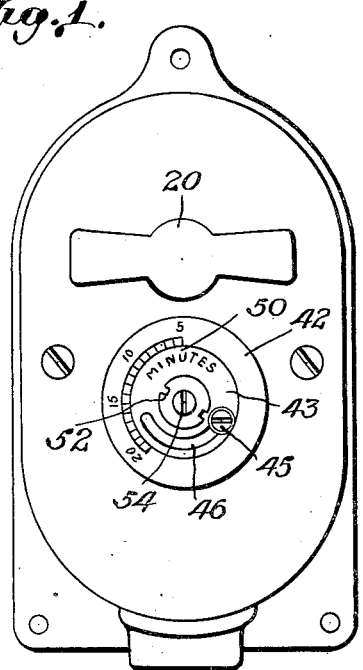
Figure 2:
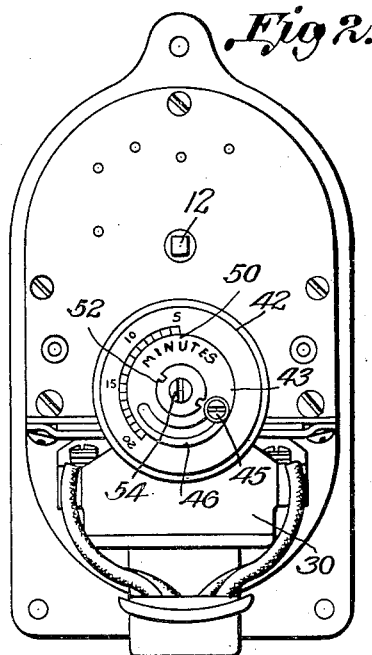
Figure 3:
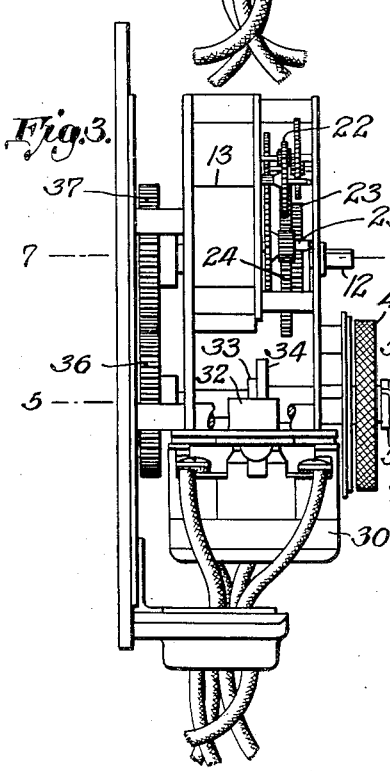
Figure 4:
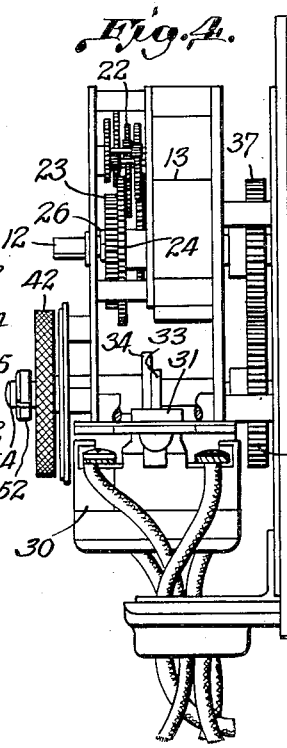
Figure 5:
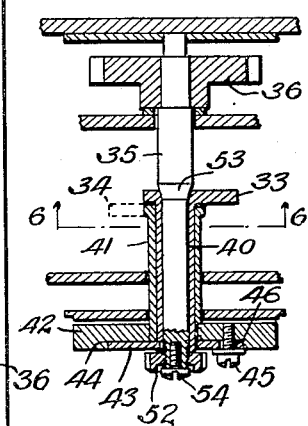
Figure 7:
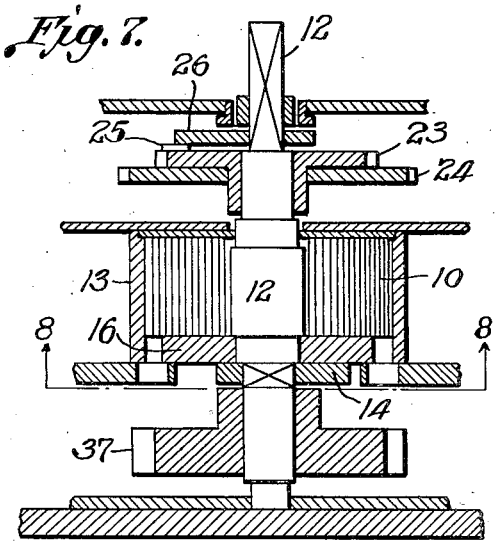
Figure 8:
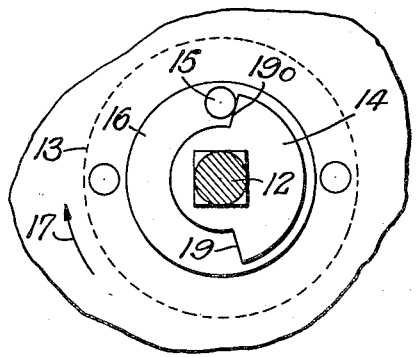
Figure 9:
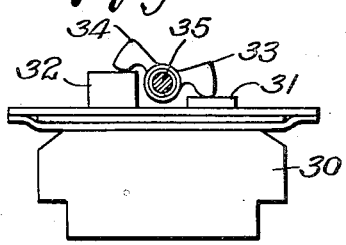
Figure 10:
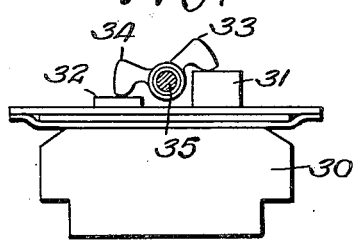
Figure 11:
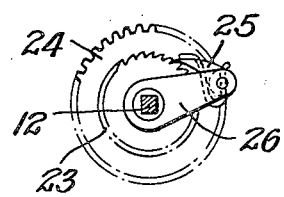
Figure 6:
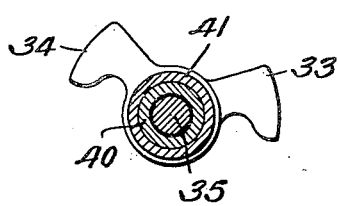

Fig. 1 is a front elevation of a lapsed time switch or apparatus embodying this invention;

Fig. 2, a like elevation with the cover removed;

Fig. 3, a side elevation with parts broken out of the switch shown in Fig. 2 looking toward the right;

Fig. 4, a like side elevation looking toward the left;

Fig. 5, a horizontal section on the line 5—5, Fig. 3, to show the rock-shaft and the cams or cranks mounted thereon;

Fig. 6, a section on the line 6—6 of Fig. 5;

Fig. 7, a horizontal section on the line 7—7, Fig. 3;

Fig. 8, a vertical section on the line 8—8, Fig. 7;

Figs. 9 and 10, details to illustrate the action of the cams or cranks on a circuit controller of known construction, and Fig. 11, a detail to be referred to.

In the present instance, is shown one embodiment of the invention. In the apparatus herein shown, the motor is the spring 10 of a clock mechanism provided with a shaft 12 to which the inner end of the spring 10 is secured and the outer end of which is secured to the spring barrel 13, which latter is stationary in the present case.

The spring 10 is wound up by turning the shaft 12 in one direction by means of a key 20 (see Fig. 1), and when the key 20 is released, the spring 10 automatically unwinds and rotates the shaft 12 in the opposite direction.

The rotation of the shaft 12 by the unwinding of the spring 10 is controlled by a retarding device comprising a train of gears 22, which are coupled to the shaft 12 by a ratchet wheel 23 fast to a gear 24 of the train of gears 22 and a pawl 25 carried by a crank or arm 26 fast on the shaft 12.

When the shaft 12 is turned by the key 20 to wind up the spring 10, the pawl 25 clicks over the ratchet wheel 23 and the shaft 12 can be turned rapidly independently of the gear train, whereas when the key 20 is released, the pawl 25 engages the ratchet wheel and the shaft 12 is then rotated by the spring, and its speed of rotation is controlled by the train of gears 22, which is provided with the usual escapement or like governing mechanism.

The shaft 12 will be hereinafter referred to as the motor-driven shaft. The motor-driven shaft 12 is provided with means for limiting its rotation in opposite directions, comprising a substantially semicircular disk 14 fast on the motor-driven shaft 12, and a pin 15 on the end plate or head 16 of the barrel 13. The spring motor 10 is wound up a substantial amount before the disk 14 is made fast on the shaft 12, and thereafter it can be further wound up by rotating the shaft 12 substantially a half turn in the direction of the arrow 17 to the position shown in Figure 8 whereby the end 19 of the disk 14 is engaged with the stop pin 15, shaft 12 is then released by the operator and the spring motor 10 unwinds and drives the disk 14 and the shaft 12 substantially a half turn in the direction opposite to that indicated by the arrow 17 until the opposite end 190 of the disk 14 engages the stop pin 15 as shown in Fig. 8, in which position it remains until the spring motor is rewound by turning the shaft 12 in the direction of the arrow 17. These movements of the motor-driven shaft 12 are utilized for operating a movable device, which in the present instance is the movable contact member of an electric switch or circuit controller 30 of known construction, which is provided with push buttons 31, 32 (see Figs. 3, 4, 9 and 10), which push buttons when depressed effect the opening and closing of the switch in a manner well understood.

In the present instance, the push buttons 31, 32 have co-operating with them devices 33, 34 operatively mounted as will be described on a rock-shaft 35 (see Fig. 5), which is geared to the motor-driven shaft 12 by a gear 36 fast on the rock-shaft 35 meshing with a gear 37 fast on the motor-driven shaft 12.

The devices 33, 34 will be hereinafter referred to as cams and may and preferably will be adjustably mounted on the rock-shaft 35, so that the period of time which must elapse between the operations of the circuit controller may be varied within limits to meet different conditions of use.

One of the cams, as, for instance, the cam 33 is fast on a sleeve 40 mounted on a reduced front portion of the rock-shaft 35, and the cam 34 is fast on a second sleeve 41 mounted on the sleeve 40.

The sleeve 41 has keyed to its front end a dial wheel or disk 42, and the sleeve 40 has keyed to its front end a wheel or disk 43, which is located in a circular recess 44 in the outer face of the disk or wheel 42.

The disks 42, 43 are adjustably connected by a screw 45 carried by the disk 42 and extended through a slot 46 in the disk 43, said slot being concentric with the shaft 35 and of a length sufficient to allow for a predetermined maximum elapsed time, which, in the present instance, is represented as twenty minutes, as indicated by the graduations and numbers on the disk or wheel 42 (see Figs. 1 and 2).

The disk 43 is provided with an index or pointer 50 which co-operates with the graduations on the disk 42.

By loosening the screw 45, the disk 43 is unclamped from the disk 42, and the latter can be turned clockwise, viewing Fig. 1, with relation to the disk 43 so as to bring a selected graduation in register with the pointer or index 50 on the disk 43, which graduation indicates the time which it is desired should elapse between the closing and the opening of the circuit controller or vice versa.

When the disk 42 is turned clockwise, the screw 45 travels in the slot 46 in the disk 43.

When the disk 42 is turned, its sleeve 41 and cam 34 are turned with it, and the latter is adjusted with relation to the cam 33, and when thus adjusted the screw 45 is set up to clamp the two disks 42, 43 and their sleeves and cams in fixed relation to each other so as to move as one piece. When the disks 42, 43 and their associated parts have been clamped together to move as one piece, they may be rendered fast on the rock-shaft 35 by a nut 52 which engages the threaded outer end of the rock-shaft 35, and acts to move the sleeve 40 into frictional engagement with a beveled portion 53 of the rock-shaft and thereby render the cam sleeves and their cams fast on the rock-shaft.

The nut 52 is held on the shaft 35 by a screw 54. The cams 33, 44 are made fast on the shaft 35 with the cam 33 engaged with the push button 31 in its depressed position, shown in Fig. 9, with the switch 30 in its open position.

The switch 30 or circuit controller may now be closed substantially in an instant by the operator turning the key 20 on the shaft 12 in the direction indicated by the arrow 17 in Fig. 8.

Rotation of the shaft 12 by the key 20 does two things. It rotates the shaft 12 in such direction as to wind up the inner end of the spring motor 10, and it also rotates the rock-shaft 35 through the gears 37, 36 uninfluenced by the motor 10, and causes the cam 34 to depress the push button 32 from the position shown in Fig. 9 to that shown in Fig. 10 and thereby close the switch, and also turns the cam 33 upwardly so as to permit the push button 31 to be elevated, as represented in Fig. 10.

The operator now releases the key 20, and the spring motor 10 becomes active and turns the rock-shaft 35 in the opposite direction by means of the gears 37, 36, but at a slower speed due to the retarding mechanism 22 and starts the downward movement of the cam 33 to depress the elevated push button 31, which latter as the time progresses is progressively depressed by the cam 33 and at the end of the predetermined lapsed time is moved by the spring motor 10 to such position as to effect the opening of the switch or circuit controller.

As the opening cam 33 is moved in one direction to depress the push button 31 into the position shown in Fig. 9, the closing cam 34 is moved upward to permit the push button 32 to be elevated, as represented in Fig. 9. The graduations on the disk 43 run from four to 20 and each graduation represents a minute. In Fig. 1, the graduation representing four minutes registers with the index 50 and at such time the screw 45 is positioned in the slot 46 so as to permit four minutes to elapse between the closing and the opening of the switch 30. As above stated, the cam 33 is turned from the position shown in Fig. 10 to that shown in Fig. 9 when the handle 20 is turned by the operator to close the switch 30. When the operator releases the handle 20, the cams 33, 34 are placed under the control of the spring motor 10, which turns the shaft 35 and the cams 33, 34 as a unit and moves the cams in the reverse direction from the position shown in Fig. 9 to that shown in Fig. 10, thereby allowing the switch 30 to be opened at the end of the predetermined lapsed time, which as represented in Fig. 1 is four minutes.

If it is desired that a longer time be allowed to elapse between the closing and the opening of the switch, as, for instance, ten minutes or any other number up to the maximum, the disk 42 is adjusted to have the graduation 10 or other selected number register with the index or pointer 50 on the disk 43.

This is effected by loosening the screw 45 and turning the disk 42 until the graduation 10 or the other selected graduation registers with the index 50.

When the disk 42 is thus turned, the closing cam 34 is moved away from the push button 32 and when the graduation 10 registers with the index 50, the screw 45 is set up to clamp the disks 42, 43 together.

When the parts are thus adjusted, the closing cam 34 is removed from the push button 32 such a distance that when the switch is closed by the cam 34, the rock-shaft 35 will be turned to such extent as to move the opening cam 33 such a distance away from the push button 31 as will cause ten minutes to elapse before the opening cam 33 opens the switch.

From the above description, it will be observed that the cams are adjustable on the rock-shaft 35 and when secured on the rock-shaft in their adjusted position may be manually moved in one direction and be motor-operated in the opposite direction.

It will be observed that by loosening the nut 52, the cams may be rendered loose on the rock-shaft 35, and may be manually turned in opposite directions to open and close the switch.

Also if desired the switch may be closed and the spring motor wound up manually by turning the disk 42 instead of employing the key 20. This arrangement, however, is not preferred because of the frictional connection between the cam sleeves and the rock-shaft.

An apparatus of the character herein described is especially useful in libraries and other places where it is desirable to limit the use of electric lamps to predetermined periods of time under certain conditions of use, and also to be enabled to use the same lamps indefinitely under other conditions of use.

In the first instance, the electric lamps are automatically turned off by the motor after the lapse of a predetermined time, and in the second instance, the turning off of the lamps is taken out of the control of the motor.

One embodiment of the invention is herein shown, but it is not desired to limit the invention to the particular construction shown.

What is claimed is:

1. In an apparatus of the character described, in combination, a motor-driven shaft, a spring motor connected therewith, a separate switch-operating shaft, gearing connecting said shaft, cams on said switch-operating shaft, and a switch co-operating with said cams to be positively moved thereby into one position by the rotation of the spring motor shaft in one direction uninfluenced by the spring motor and to be positively moved into another position by rotation of the spring motor shaft in the opposite direction under the influence of said spring motor.

2. In an apparatus of the character described, in combination, a motor-driven shaft, a spring motor connected therewith, a separate switch-operating shaft, gearing connecting said shafts, cams on said switch-operating shaft, a switch co-operating with said cams to be moved thereby into one position by the rotation of the spring motor shaft in on direction uninfluenced by the spring motor and to be moved into another position by rotation of the spring motor shaft in the opposite direction under the influence of said spring motor, and means for adjusting said cams on said switch-operating shaft for varying the length of time the switch-operating shaft is being rotated by the spring motor.

3. In an apparatus of the character described, in combination, a rock-shaft, a sleeve adjustably mounted on said rock-shaft and provided with a cam, means for rendering said sleeve fast on said rock-shaft, a switch member operated by said cam, a separate motor-driven shaft geared to said rock-shaft, a spring motor connected with said motor-driven shaft to enable said rock-shaft to be rotated in one direction by manual operation of said motor-driven shaft, and to be rotated in the opposite direction by the motor-driven shaft under the influence of said spring, and means on said rock-shaft for varying the position of said cam with relation to said switch to vary the length of time said rock-shaft is under the influence of said spring.

4. In an apparatus of the character described, in combination, a movable member, a rotatable cam shaft provided with cams co-operating with said movable member to positively effect movement thereof in opposite directions, a motor-driven shaft separate from said cam shaft, a motor for driving it, gearing for connecting said shafts, means for retarding said motor-driven shaft when driven by said motor, and means for coupling the motor-driven shaft with said retarding means to enable the cam shaft to be rotated by said motor-driven shaft independently of said motor and actuate the movable member substantially in an instant, and to enable the cam shaft to be driven by said motor and actuate the movable member after a predetermined lapse of time.

5. In an apparatus of the character described, in combination, a movable member, a rock-shaft, means on said rock-shaft co-operating with said movable member to effect movement thereof, a motor-driven shaft, a motor to drive the latter, retarding means for said motor-driven shaft, gearing connecting the motor-driven shaft with the said rock-shaft, and means for coupling the motor-driven shaft with its retarding means to permit the motor-driven shaft to be rotated in one direction and operate the rock-shaft to positively move the movable member into one position independently of said motor, and to permit the rock-shaft to be driven by said motor a predetermined time before said rock-shaft becomes effective to positively move the movable member into a different position.

6. In an apparatus of the character described, in combination, a rotatable shaft, sleeves mounted on said shaft and provided with cams, means for turning one of said sleeves with relation to the other, means for securing said sleeves in fixed relation to each other in their adjusted positions, and means for securing said adjusted sleeves in fixed relation to said rotatable shaft to move therewith as a unit, and a switch positively operated by one of said cams when said shaft is rotated in one direction and also positively operated by the other of said cams when said shaft is rotated in the opposite direction, to be moved into its opened and closed positions.

7. In an apparatus of the character described, in combination, a rotatable shaft, sleeves mounted on said shaft and normally loose thereon, cams on said sleeves, a disk affixed to one of said sleeves, a second disk affixed to the other of said sleeves and provided with a slot concentric with said shaft, a screw extended through said slot for securing said disks and sleeves in fixed relation, and a nut on said shaft co-operating with one of said sleeves to render the latter fast on said shaft to rotate therewith.

8. In an apparatus of the character described, in combination, a rock-shaft, a sleeve adjustably mounted on said rock-shaft and provided with a cam, means for rendering said sleeve fast on said rock-shaft, a switch member operated by said cam, a separate motor-driven shaft geared to said rock-shaft, a spring motor connected with said motor-driven shaft to enable said rock-shaft to be rotated in one direction by manual operation of said motor-driven shaft and effect the operation of the said switch by said cam, and to be rotated in the opposite direction by the motor-driven shaft under the influence of said spring to render the said cam inoperative upon the said switch.

9. In an apparatus of the character described, in combination, a main shaft, means for manually rotating it in one direction, a motor for rotating it in the opposite direction, a switch-operating shaft geared to the main shaft to be rotated thereby, a switch-closing cam and a switch-opening cam on said switch-operating shaft to positively close and open said switch, one of said cams being adjustable on said switch-operating shaft to vary its position with relation to said switch and thereby vary the length of time the latter remains closed independently of the main shaft.

10. In an apparatus of the character described, in combination, a main shaft, means for manually rotating it in one direction, a motor for rotating it in the opposite direction, a switch-operating shaft geared to the main shaft to be rotated thereby, a switch-closing cam and a switch-opening cam on said switch-operating shaft to positively close and open said switch, and means for rendering said cams fast or loose on their shaft to enable them to be motor-operated or manually operated.

CARL E. SUNDBERG.